United States Patent
Patel et al.

(10) Patent No.: US 12,367,138 B1
(45) Date of Patent: Jul. 22, 2025

(54) METHOD TO EXTEND THE LIFESPAN OF A DATA STORAGE DEVICE BY REPURPOSING BLOCKS FROM BURST POOL

(71) Applicant: SanDisk Technologies LLC, Addison, TX (US)

(72) Inventors: Karan Patel, Bangalore (IN); Amit Chopra, Bangalore (IN); Nitin Jain, Bangalore (IN)

(73) Assignee: Sandisk Technologies Inc., Milpitas, CA (US)

( * ) Notice: Subject to any disclaimer, the term of this patent is extended or adjusted under 35 U.S.C. 154(b) by 0 days.

(21) Appl. No.: 18/409,550

(22) Filed: Jan. 10, 2024

(51) Int. Cl.
*G06F 12/02* (2006.01)

(52) U.S. Cl.
CPC .. *G06F 12/0246* (2013.01); *G06F 2212/7204* (2013.01)

(58) Field of Classification Search
CPC ............... G06F 12/0246; G06F 2212/7204
See application file for complete search history.

(56) References Cited

U.S. PATENT DOCUMENTS

| | | | |
|---|---|---|---|
| 7,747,813 B2 | 6/2010 | Danilak | |
| 8,954,689 B2 | 2/2015 | Seekins | |
| 9,495,101 B2 | 11/2016 | Lieber | |
| 10,998,066 B2 | 5/2021 | Jean | |
| 2008/0082725 A1 | 4/2008 | Elhamias | |
| 2011/0271043 A1* | 11/2011 | Segal | G06F 12/0246 711/E12.001 |
| 2018/0336140 A1* | 11/2018 | Guddekoppa | G06F 12/0246 |
| 2021/0089444 A1* | 3/2021 | Liang | G11C 16/32 |

* cited by examiner

*Primary Examiner* — Chie Yew
(74) *Attorney, Agent, or Firm* — Arlene P. Neal; Neal Blibo LLC

(57) ABSTRACT

A storage device postpones entry into a read-only mode due to faulty blocks that cannot be written to on a memory device. The memory device is divided into blocks. Blocks used for storing host data are placed in a main area pool, blocks used for storing host data and for peak write operations are placed in a burst pool, and blocks used for storing control information are placed in the control pool. A controller executes a read-only mode extension protocol to determine when a number of faulty blocks in the main area pool, control pool, or burst pool is approaching a threshold for placing the storage device in a read-only mode. If the storage device is approaching the read-only mode, the controller reduces and/or repurposes a number of the blocks used for storing host data in the burst pool to prevent the storage device from entering the read-only mode phase.

18 Claims, 6 Drawing Sheets

METHOD TO EXTEND THE LIFESPAN OF A DATA STORAGE DEVICE BY REPURPOSING BLOCKS FROM BURST POOL

BACKGROUND

A storage device may be communicatively coupled to a host and to non-volatile memory including, for example, a NAND flash memory device on which the storage device may store data received from the host. The NAND flash memory may be divided into partitions which may be further divided into blocks. Data may be stored in the blocks in various formats, with the formats being defined by the number of bits that may be stored per memory cell. For example, a single-layer cell (SLC) format may write one bit of information per memory cell, a multi-layer cell (MLC) format may write two bits of information per memory cell, a triple-layer cell (TLC) format may write three bits of information per memory cell, and a quadruple-layer cell (QLC) format may write four bits of information per memory cell, and so on.

The lifespan of the storage device may vary depending on factors such as the quality of the memory device used in the storage device, wear-out management of the blocks on the memory device, thermal handling, and management of power and shutdowns, among others. The storage device may implement firmware to keep the storage device usable for as long as possible. However, when the storage device enters a state where data may no longer be written to the memory device, the storage device may enter a read-only mode. In the read-only mode, the host may be able to read data written on the memory device but may be unable to program/write data to the memory device via the storage device. When the storage device enters the read-only mode, the storage device is considered to be in an end-of-life status.

To delay the storage device from entering the end-of-life status, if some of the blocks on the memory device become defective, a current approach reduces the storage device write capacity by removing the defective blocks. For example, if the memory device has one thousand blocks and one hundred of them are defective and cannot be written on (those blocks are also referred to herein as bad blocks or grown bad blocks), this approach may reduce the drive write capacity to nine hundred blocks. Another approach allows for the over-provisioning of spare blocks that may be used when the storage device is nearing the end-of-life status. Over-provisioning of spare blocks may result in increased costs. Another approach may store fewer bits per memory cell than a block is designed for when the storage device is nearing the end-of-life status. For example, the approach may delay the storage device from entering the read-only mode by using TLC blocks as MLC blocks or by using MLC blocks as SLC blocks. All of these approaches may have an adverse impact on the storage device's write capacity as they may reduce the write capacity of the storage device. When the storage device capacity is reduced, the reduction may be clearly visible to a user, and reduction of the storage device capacity may not be an acceptable or tenable solution for the user.

SUMMARY

In some implementations, the storage device may postpone entry into a read-only mode due to faulty blocks that cannot be written to on a memory device. The storage device includes a memory device divided into blocks. Blocks used for storing host data and covering a write capacity of the storage device are placed in a main area pool on the memory device, blocks used for storing host data and for peak write operations are placed in a burst pool on the memory device, and blocks used for storing control information are placed in a control pool. The storage device also includes a controller to execute a read-only mode extension protocol to determine when faulty blocks in the main area pool, the control pool, or the burst pool are approaching a threshold for placing the storage device in a read-only mode phase. When the storage device is approaching the read-only mode phase, the controller reduces and/or repurposes a number of the blocks used for storing host data in the burst pool to prevent the storage device from entering the read-only mode phase.

In some implementations, a method is provided on a storage device for delaying the storage device from entering into a read-only mode due to faulty blocks that cannot be written to on a memory device. The method includes storing host data in blocks in a main area pool on a memory device, storing host data for peak write operations in blocks in a burst pool on the memory device, and storing control information in blocks in a control pool in the burst pool. The method also includes executing a read-only mode extension protocol to determine when faulty blocks in the main area pool or the burst pool are approaching a threshold for placing the storage device in a read-only mode phase. The method further includes reducing and/or repurposing a number of the blocks used for storing host data in the burst pool to prevent the storage device from entering the read-only mode phase.

In some implementations, a method is provided on a storage device for delaying a storage device from entering into a read-only mode due to faulty blocks that cannot be written to on a memory device. The method includes storing host data in blocks in a main area pool on a memory device, storing host data for peak write operations in blocks in a burst pool on the memory device, and storing control information in blocks in a control pool in the burst pool. The method also includes executing a first read-only mode extension protocol, a second read-only mode extension protocol, or a third read-only mode extension protocol. The first read-only mode extension protocol includes determining that the storage device is entering the read-only mode phase because of a newly faulty block used for storing host data in the burst pool and that the burst pool has a predefined minimum number of available blocks used for storing host data; increasing a bad block threshold by a preconfigured value; and reducing the number of blocks used for storing host data in the burst pool by the preconfigured value. The second read-only mode extension protocol includes determining that the storage device is entering the read-only mode phase because of a newly faulty block in the main area pool and that the burst pool has a predefined minimum number of available blocks used for storing host data; subtracting a predefined number of blocks used for storing host data from the burst pool; adding subtracted blocks to the main area pool; configuring blocks added to the main area pool to a format storing more bits per memory cell; and reducing the burst pool by the predefined number of blocks subtracted from the burst pool. The read-only mode extension protocol includes determining that the storage device is entering the read-only mode phase because of a new faulty block in the control pool and that the burst pool has a predefined minimum number of available blocks used for storing host data; subtracting a predefined number of blocks used for storing host data from the burst pool; adding subtracted blocks to the control pool; configuring blocks added to the control pool to store control data; and reducing the burst pool by the predefined number of blocks subtracted from the burst pool.

Figure 1:
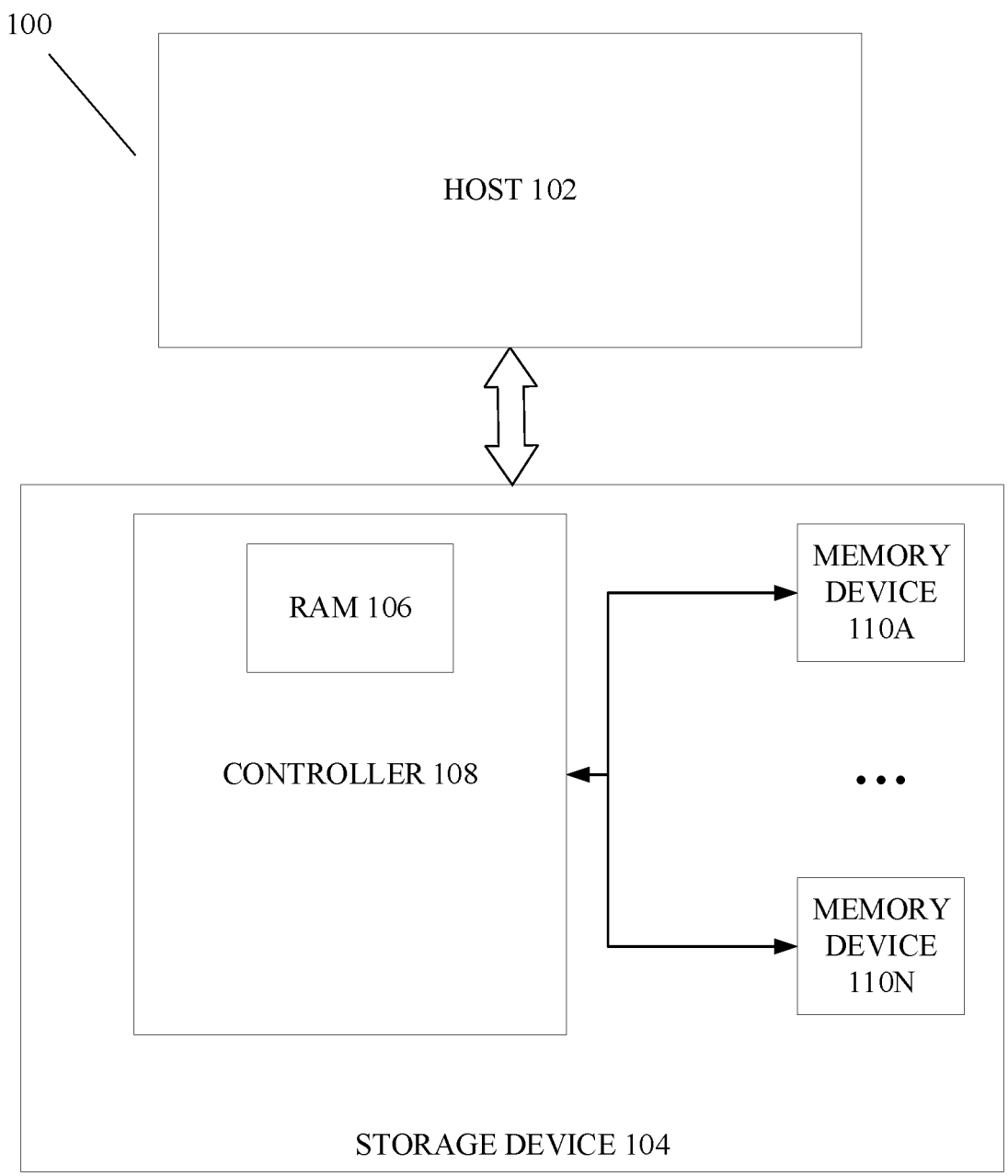
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 and storage device 104 may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity).

Storage device 104 may include a random-access memory (RAM) 106, a controller 108, and one or more non-volatile memory devices 110*a*-110*n* (referred to herein as the memory device(s) 110). Storage device 104 may be, for example, a solid-state drive (SSD), and the like. RAM 106 may be temporary storage such as a dynamic RAM (DRAM) that may be used to cache information in storage device 104.

Controller 108 may interface with host 102 and process foreground operations including instructions transmitted from host 102. For example, controller 108 may read data from and/or write to memory device 110 based on instructions received from host 102. Controller 108 may also execute background operations to manage resources on memory device 110. For example, controller 108 may monitor memory device 110 and may execute garbage collection and other relocation functions per internal relocation algorithms to refresh and/or relocate the data on memory device 110.

Memory device 110 may be flash-based. For example, memory device 110 may be a NAND flash memory that may be used for storing host and control data over the operational life of memory device 110. Memory device 110 may be included in storage device 104 or may be otherwise communicatively coupled to storage device 104. Memory device 110 may be divided into blocks and data may be stored in the blocks in various formats, with the formats being defined by the number of bits that may be stored per memory cell. For example, a single-layer cell (SLC) format may write one bit of information per memory cell, a multi-layer cell (MLC) format may write two bits of information per memory cell, a triple-layer cell (TLC) format may write three bits of information per memory cell, and a quadruple-layer cell (QLC) format may write four bits of information per memory cell, and so on. The blocks in memory device 110 may be hybrid blocks, wherein the blocks may be programmed in multiple formats. For example, a block may be initially programmed as an SLC block and later programmed as a TLC block. Formats storing fewer bits in each cell are more easily accessed, durable, and less error-prone than formats storing more bits per cell. However, formats storing fewer bits in each cell are also more expensive.

To increase the performance of storage device 104, the blocks on memory device 110 may be divided into two pools, a main area pool and a burst pool. For example, if storage device 104 has one terabyte (TB) capacity, the main area pool may include, for example, one thousand TLC blocks, each of which may store one gigabyte of data, covering the 1 TB capacity of storage device 104. The burst pool which may include additional blocks equal to a percentage of the blocks in the main pool. The blocks in the burst pool may be SLC blocks, some of which may be used for storing host data and some of which may be used for storing control data. For example, the burst pool may include additional SLC blocks equal to five percent of the storage device's 104 capacity.

The SLC blocks used for storing control data in the burst pool may be assigned to a control pool and may be used by storage device 104 for storing management information that is internal to the operations on storage device 104. For example, the SLC control blocks may store management information that may be used internally on storage device 104 for background operations. Storing information on blocks, such as TLC blocks, which store more bits of information per memory cell may be a more complex operation than storing information on blocks, such as SLC blocks, which store fewer bits per memory cell. As such, the TLC blocks in the main area pool may be used for sustained write performance. The SLC blocks in the burst pool used for storing host data may be reserved for performance-related tasks (for example, peak/burst write performance-related tasks) and may be reduced without affecting the overall capacity of storage device 104.

When storage device 104 is newly installed, host writes may be sent to the burst pool as storage device 104 is processing foreground instructions. During background operations, controller 108 may move data from the SLC blocks in the burst pool to the TLC blocks in the main area pool. Over time as storage device 104 becomes older and the SLC blocks in the burst pool become full, controller 108 may write host data directly to the TLC blocks in the main pool, which may cause the speed of storage device 104 to gradually reduce.

The lifespan of storage device 104 may vary for different types of storage devices. For example, higher-quality storage devices may have higher endurance and a longer lifespan than fallout storage devices. The lifespan of storage device 104 may be the period from when storage device 104 is initially used by host 102 to when storage device 104 enters a read-only mode and can no longer support write operations. To prevent storage device 104 from entering the read-only mode when storage device 104 is entering a phase that is close to the end of the lifespan of storage device 104, controller 108 may gradually reduce burst performance support to extend the lifespan of storage device 104.

Over the lifespan of storage device 104, blocks in the main area pool and/or the burst pool may become faulty and user data may not be written to the faulty blocks. Storage device 104 may enter the read-only mode when the number of faulty TLC blocks in the main area pool reaches a TLC bad block threshold, the number of faulty SLC blocks in the burst pool reaches a SLC bad block threshold, or the number of faulty control blocks in the control pool reaches a control bad block threshold. The TLC bad block threshold may represent a maximum allowable number of bad TLC blocks in the main area pool. The SLC bad block threshold may represent a maximum allowable number of bad SLC blocks in the burst pool. The control bad block threshold may represent a maximum allowable number of bad control blocks in the control pool.

In some implementations, host 102 may obtain storage device 104 health information from storage device 104. For example, storage device 104 may determine if the number of faulty blocks in the burst pool or the main area pool is nearing a given threshold and may provide this information to host 102. Host 102 may determine if storage device 104 is nearing an end-of-life status (i.e., if storage device 104 is about to enter the read-only mode). If storage device 104 is nearing the end-of-life status, host 102 may send a device life control command to storage device 104 for storage device 104 to execute read-only mode extension protocols to extend the storage device's lifespan. After storage device 104 executes a read-only mode extension protocol for extending the lifespan of storage device 104, storage device 104 may send an asynchronous event notification to host 102. In some implementations, when storage device 104 determines that it is nearing the end-of-life status, storage device 104 may monitor its health status and execute a read-only mode extension protocol to extend the storage device's lifespan.

In a first read-only mode extension protocol, as SLC blocks in the burst pool used for storing host data become faulty, controller 108 may determine when the faulty SLC blocks in the burst pool used for storing host data (also referred to herein as bad SLC blocks or grown bad SLC blocks) reaches the SLC bad block threshold. When controller 108 determines that the number of grown bad SLC blocks in the burst pool used for storing host data has reached the SLC bad block threshold, controller 108 may place storage device 104 in a read-only mode. When storage device 104 enters the read-only mode, storage device 104 may allow host 102 to read data stored on memory device 110 but storage device 104 may be unable to write additional data to memory device 110.

To prolong the write capacity of storage device 104 and postpone placing storage device 104 in the read-only mode, controller 108 may monitor when an SLC block in the burst pool used for storing host data is marked as a bad SLC block because the block has become faulty and can no longer be used for write operations. Controller 108 may determine if storage device 104 is about to enter the read-only mode because of the newly grown bad SLC block. For example, controller 108 may determine if the number of bad SLC blocks in the burst pool used for storing host data is one less than the SLC bad block threshold. If controller 108 determines that storage device 104 is not about to enter the read-only mode because of the newly grown bad SLC block, controller 108 may continue processing. For example, if controller 108 determines that the number of bad SLC blocks in the burst pool used for storing host data is less than the SLC bad block threshold minus one, controller 108 may take no further actions (i.e., controller 108 may continue with the operation in progress).

If controller 108 determines that storage device 104 is about to enter the read-only mode because of the newly grown bad SLC blocks in the burst pool used for storing host data, controller 108 may determine if the burst pool has a predefined minimum number of available SLC blocks used for storing host data. For example, if the number of bad blocks in the burst pool is equal to the SLC bad block threshold minus one, controller 108 may determine if the burst pool has a minimum of ten percent of the SLC blocks used for storing host data available. If the burst pool does not have the preconfigured number of available SLC blocks used for storing host data, controller 108 may place storage device 104 in the read-only mode. If the burst pool has the preconfigured number of available SLC blocks used for storing host data, controller 108 may increase the SLC bad block threshold by a preconfigured SLC value. For example, controller 108 may increase the SLC bad block threshold by five. Controller 108 may reduce the number of SLC blocks in the burst pool by the SLC value. By increasing the SLC bad block threshold when the number of bad SLC blocks in the burst pool used for storing host data is one bad block away from reaching the SLC bad block threshold, controller 108 may prevent the next bad SLC blocks in the burst pool used for storing host data from causing the number of bad SLC blocks in the burst pool to be equal to the SLC bad block threshold and may prevent storage device 104 from entering the read-only mode. Although storage device 104 may be prevented from entering the read-only mode when the SLC bad block threshold is increased, the burst performance on storage device 104 may be compromised when the number of SLC blocks used for storing host data have been reduced.

In a second read-only mode extension protocol, as TLC blocks in the main area pool become faulty, controller 108 may determine when the faulty TLC blocks in the main area pool reach the TLC bad block threshold. When controller 108 determines that the number of grown bad TLC blocks in the main area pool has reached the TLC bad block threshold, controller 108 may place storage device 104 in a read-only mode.

To prolong the write capacity of storage device 104 and postpone placing storage device 104 in the read-only mode because of bad TLC blocks, controller 108 may monitor when a TLC block in the main area pool is marked as a bad block because the block has become faulty and can no longer be used for write operations. Controller 108 may determine if storage device 104 is about to enter the read-only mode because of the newly grown bad TLC block. For example, controller 108 may determine if the number of bad TLC blocks in the main area pool is one less than the TLC bad block threshold. If controller 108 determines that storage device 104 is not about to enter the read-only mode because of the newly grown bad TLC block, controller 108 may continue processing. For example, if controller 108 determines that the number of bad TLC blocks in the main area pool is fewer than the TLC bad block threshold minus one, controller 108 may continue with the operation in progress.

If controller 108 determines that storage device 104 is about to enter the read-only mode because of the newly grown bad TLC block, controller 108 may determine if the burst pool with SLC blocks has a predefined minimum number of available SLC blocks used for storing host data. For example, if the number of bad blocks in the main area pool is equal to the TLC bad block threshold minus one, controller 108 may determine if the burst pool with SLC blocks has, for example, at least ten percent of the SLC blocks used for storing host data available. If the burst pool does not have the preconfigured minimum number of available SLC blocks used for storing host data, controller 108 may place storage device 104 in the read-only mode.

If the burst pool has the preconfigured minimum number of available SLC blocks, controller 108 may subtract a predefined number of SLC blocks used for storing host data from the burst pool, add the subtracted SLC blocks to the main area pool, and configure those blocks to be used as TLC blocks. For example, controller 108 may subtract five SLC blocks used for storing host data from the burst pool, add the five SLC blocks to the main area pool, and configure the five SLC blocks added to the main area pool to be used as TLC blocks. Controller 108 may reduce the burst pool by the number of SLC blocks subtracted from the burst pool and increase the TLC bad block threshold by the number of newly added TLC blocks. By repurposing a number of the SLC blocks used for storing host data and reducing the burst performance on storage device 104, controller 108 may prevent storage device 104 from entering the read-only mode when the main area pool has a lot of grown bad TLC blocks.

In a third read-only mode extension protocol, as control blocks in the burst pool become faulty, controller 108 may determine when the number of faulty control blocks in the control pool reaches a control bad block threshold. When controller 108 determines that the number of grown bad control blocks in the control pool has reached the control bad block threshold, controller 108 may place storage device 104 in a read-only mode.

To prolong the write capacity of storage device 104 and postpone placing storage device 104 in the read-only mode because of bad control blocks, controller 108 may monitor when a control block in the control pool is marked as a bad block because the block has become faulty and can no longer be used for management operations. Controller 108 may determine if storage device 104 is about to enter the read-only mode because of the newly grown bad control block. For example, controller 108 may determine if the number of bad control blocks in the control pool is one less than the control bad block threshold. If controller 108 determines that storage device 104 is not about to enter the read-only mode because of the newly grown bad control block, controller 108 may continue processing. For example, if controller 108 determines that the number of bad control blocks in the control pool is less than the control bad block threshold minus one, controller 108 may continue with the operation in progress.

If controller 108 determines that storage device 104 is about to enter the read-only mode because of the newly grown bad control block, controller 108 may determine if the burst pool with SLC blocks has a predefined minimum number of available SLC blocks used for storing host data. For example, if the number of bad control blocks in the control pool is equal to the control bad block threshold minus one, controller 108 may determine if the burst pool with SLC blocks has at least ten percent of the SLC blocks used for storing host data available. If the burst pool does not have the preconfigured minimum number of available SLC blocks used for storing host data, controller 108 may place storage device 104 in the read-only mode.

If the burst pool has the preconfigured minimum number of available SLC blocks used for storing host data, controller 108 may subtract a predefined number of SLC blocks from the burst pool, add the subtracted SLC blocks to the control pool, and configure those blocks to be used as control blocks. For example, controller 108 may subtract six SLC blocks from the burst pool, add the six SLC blocks to the control pool, and configure the six SLC blocks added to the control pool to be used as control blocks. Controller 108 may reduce the burst pool used for storing host data by the number of SLC blocks subtracted from the burst pool and increase the control bad block threshold by the number of newly added control blocks. By repurposing a number of the SLC blocks used for storing host data and reducing the burst performance on storage device 104, controller 108 may prevent storage device 104 from entering the read-only mode when the control pool has a lot of grown bad control blocks.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
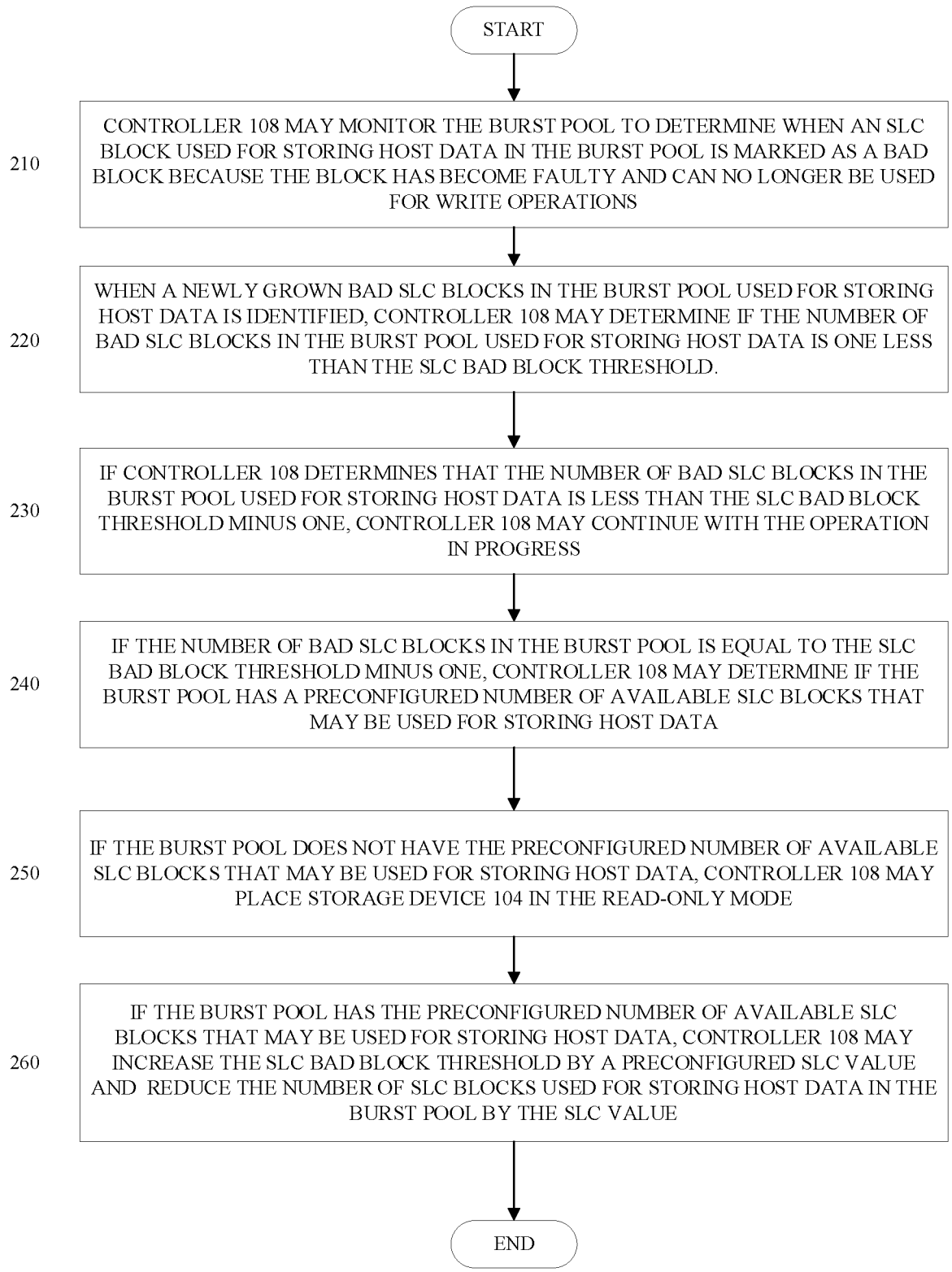
FIG. 2 is an example flow diagram of a first read-only mode extension protocol that may be used to extend the write capacity of a storage device in accordance with some implementations.

FIG. 2 is an example flow diagram of a first read-only mode extension protocol that may be used to extend the write capacity of a storage device in accordance with some implementations. At 210, controller 108 may monitor the burst pool to determine when an SLC block used for storing host data in the burst pool is marked as a bad block because the block has become faulty and can no longer be used for write operations. At 220, when a newly grown bad SLC blocks in the burst pool used for storing host data is identified, controller 108 may determine if the number of bad SLC blocks in the burst pool used for storing host data is one less than the SLC bad block threshold. At 230, if controller 108 determines that the number of bad SLC blocks in the burst pool used for storing host data is less than the SLC bad block threshold minus one, controller 108 may continue with the operation in progress.

At 240, if the number of bad SLC blocks in the burst pool is equal to the SLC bad block threshold minus one, controller 108 may determine if the burst pool has a preconfigured number of available SLC blocks that may be used for storing host data. At 250, if the burst pool does not have the preconfigured number of available SLC blocks that may be used for storing host data, controller 108 may place storage device 104 in the read-only mode. At 260, if the burst pool has the preconfigured number of available SLC blocks that may be used for storing host data, controller 108 may increase the SLC bad block threshold by a preconfigured SLC value and reduce the number of SLC blocks used for storing host data in the burst pool by the SLC value. FIG. 2 is provided as an example. Other examples may differ from what is described in FIG. 2.

Figure 3:
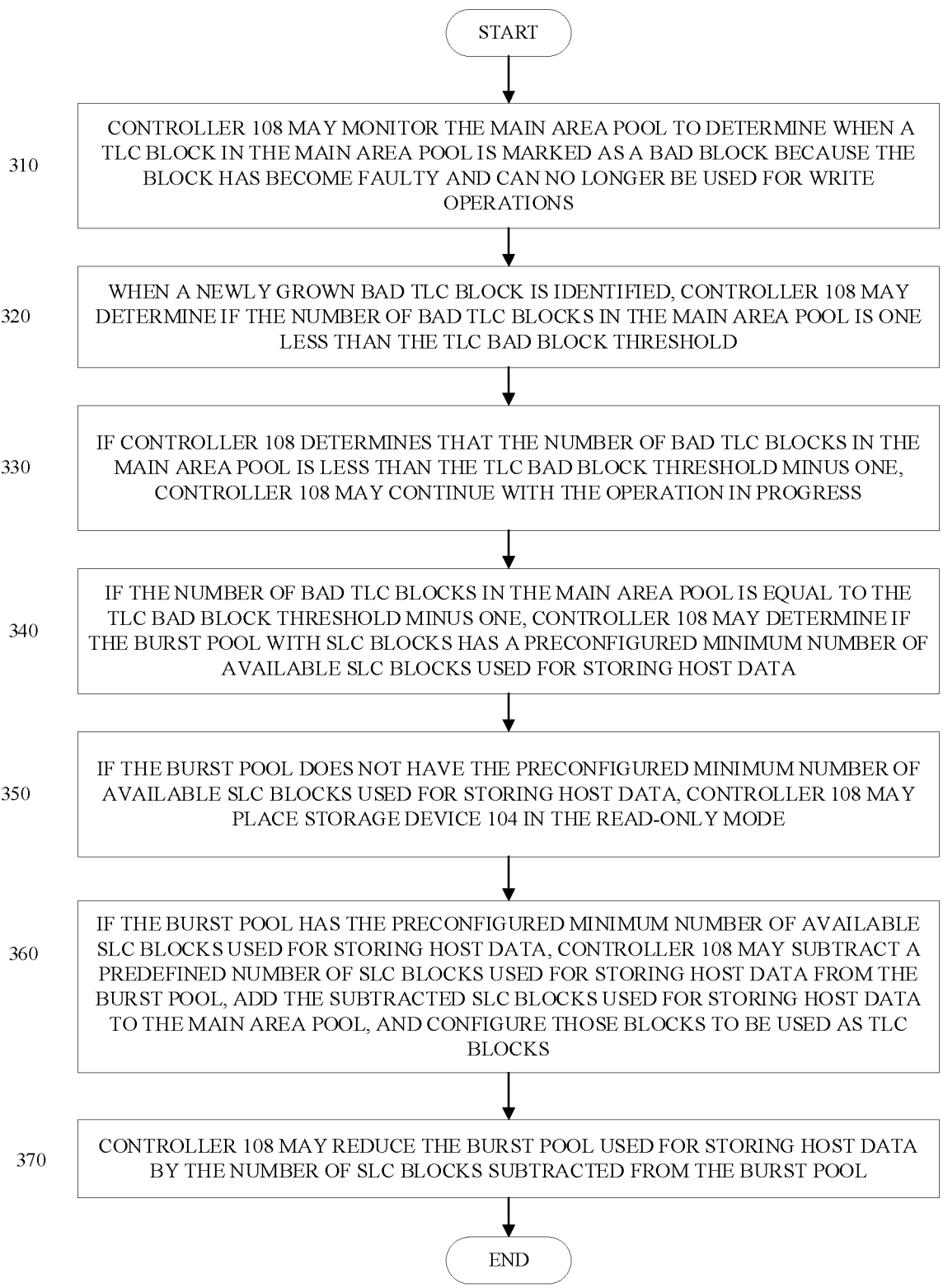
FIG. 3 is an example flow diagram of a second read-only mode extension protocol that may be used to extend the write capacity of a storage device in accordance with some implementations.

FIG. 3 is an example flow diagram of a second read-only mode extension protocol that may be used to extend the write capacity of a storage device in accordance with some implementations. At 310, controller 108 may monitor the main area pool to determine when a TLC block in the main area pool is marked as a bad block because the block has become faulty and can no longer be used for write operations. At 320, when a newly grown bad TLC block is identified, controller 108 may determine if the number of bad TLC blocks in the main area pool is one less than the TLC bad block threshold. At 330, if controller 108 determines that the number of bad TLC blocks in the main area pool is less than the TLC bad block threshold minus one, controller 108 may continue with the operation in progress.

At 340, if the number of bad TLC blocks in the main area pool is equal to the TLC bad block threshold minus one, controller 108 may determine if the burst pool with SLC blocks has a preconfigured minimum number of available SLC blocks used for storing host data. At 350, if the burst pool does not have the preconfigured minimum number of available SLC blocks used for storing host data, controller 108 may place storage device 104 in the read-only mode.

At 360, if the burst pool has the preconfigured minimum number of available SLC blocks used for storing host data, controller 108 may subtract a predefined number of SLC blocks used for storing host data from the burst pool, add the subtracted SLC blocks used for storing host data to the main area pool, and configure those blocks to be used as TLC blocks. At 370, controller 108 may reduce the burst pool used for storing host data by the number of SLC blocks subtracted from the burst pool. FIG. 3 is provided as an example. Other examples may differ from what is described in FIG. 3.

Figure 4:
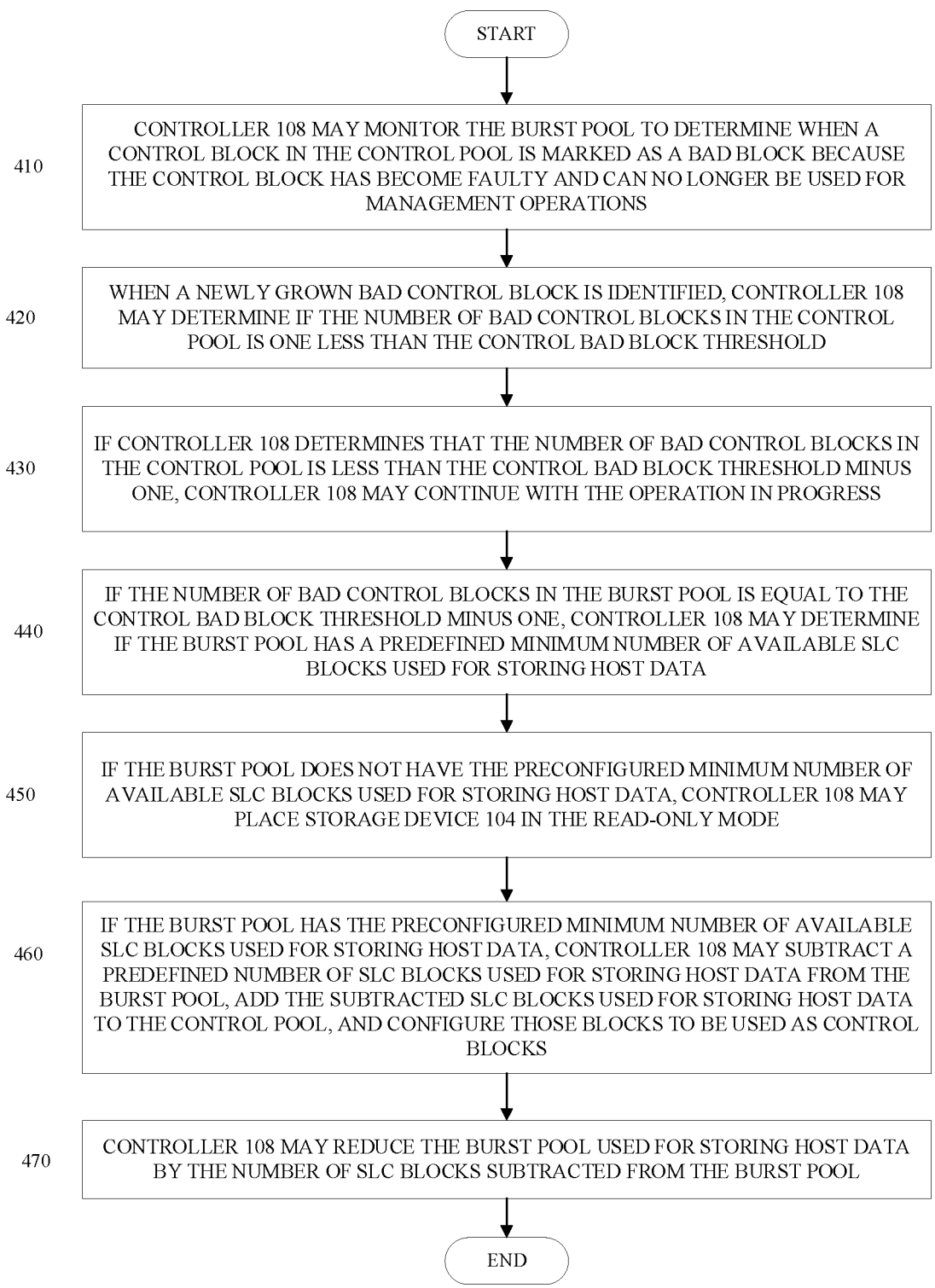
FIG. 4 is an example flow diagram of a third read-only mode extension protocol that may be used to extend the write capacity of a storage device in accordance with some implementations.

FIG. 4 is an example flow diagram of a third read-only mode extension protocol that may be used to extend the write capacity of a storage device in accordance with some implementations. At 410, controller 108 may monitor the burst pool to determine when a control block in the control pool is marked as a bad block because the control block has become faulty and can no longer be used for management operations. At 420, when a newly grown bad control block is identified, controller 108 may determine if the number of bad control blocks in the control pool is one less than the control bad block threshold. At 430, if controller 108 determines that the number of bad control blocks in the control pool is less than the control bad block threshold minus one, controller 108 may continue with the operation in progress.

At 440, if the number of bad control blocks in the burst pool is equal to the control bad block threshold minus one, controller 108 may determine if the burst pool has a predefined minimum number of available SLC blocks used for storing host data. At 450, if the burst pool does not have the preconfigured minimum number of available SLC blocks used for storing host data, controller 108 may place storage device 104 in the read-only mode.

At 460, if the burst pool has the preconfigured minimum number of available SLC blocks used for storing host data, controller 108 may subtract a predefined number of SLC blocks used for storing host data from the burst pool, add the subtracted SLC blocks used for storing host data to the control pool, and configure those blocks to be used as control blocks. At 470, controller 108 may reduce the burst pool used for storing host data by the number of SLC blocks subtracted from the burst pool. FIG. 4 is provided as an example. Other examples may differ from what is described in FIG. 4.

Figure 5:
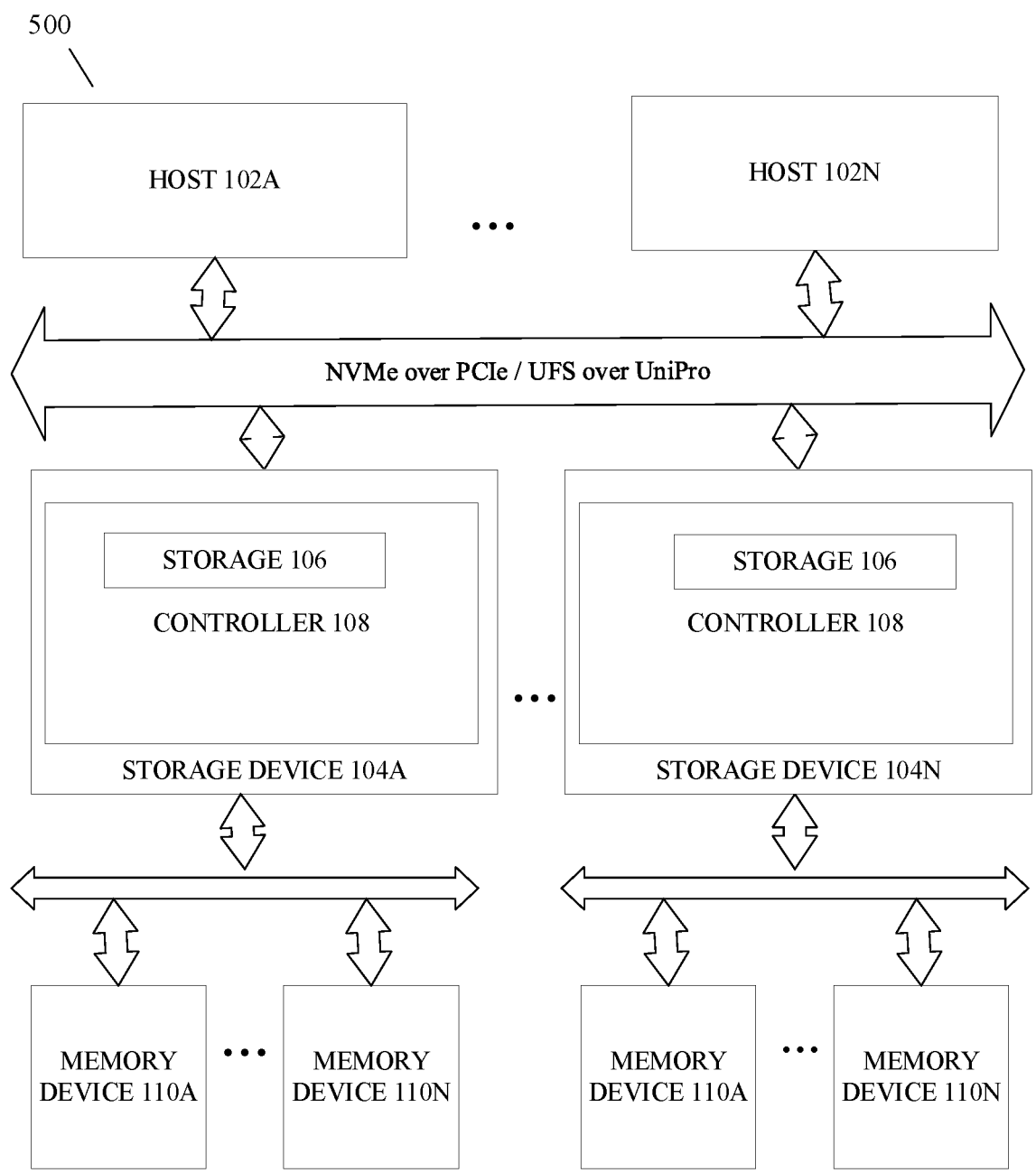
FIG. 5 is a diagram of an example environment in which systems and/or methods described herein are implemented.

FIG. 5 is a diagram of an example environment in which systems and/or methods described herein are implemented. As shown in FIG. 5, Environment 500 may include hosts 102-102*n* (referred to herein as host(s) 102), and storage devices 104*a*-104*n* (referred to herein as storage device(s) 104).

Storage device 104 may include a controller 108 to manage the resources on storage device 104. Controller 108 may execute a read-only mode extension protocol to extend the write capacity of storage device 104. Hosts 102 and storage devices 104 may communicate via Non-Volatile Memory Express (NVMe) over peripheral component interconnect express (PCI Express or PCIe) standard, the Universal Flash Storage (UFS) over Unipro, or the like.

Devices of Environment 500 may interconnect via wired connections, wireless connections, or a combination of wired and wireless connections. For example, the network of FIG. 5 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of Environment 500 may perform one or more functions described as being performed by another set of devices of Environment 500.

Figure 6:
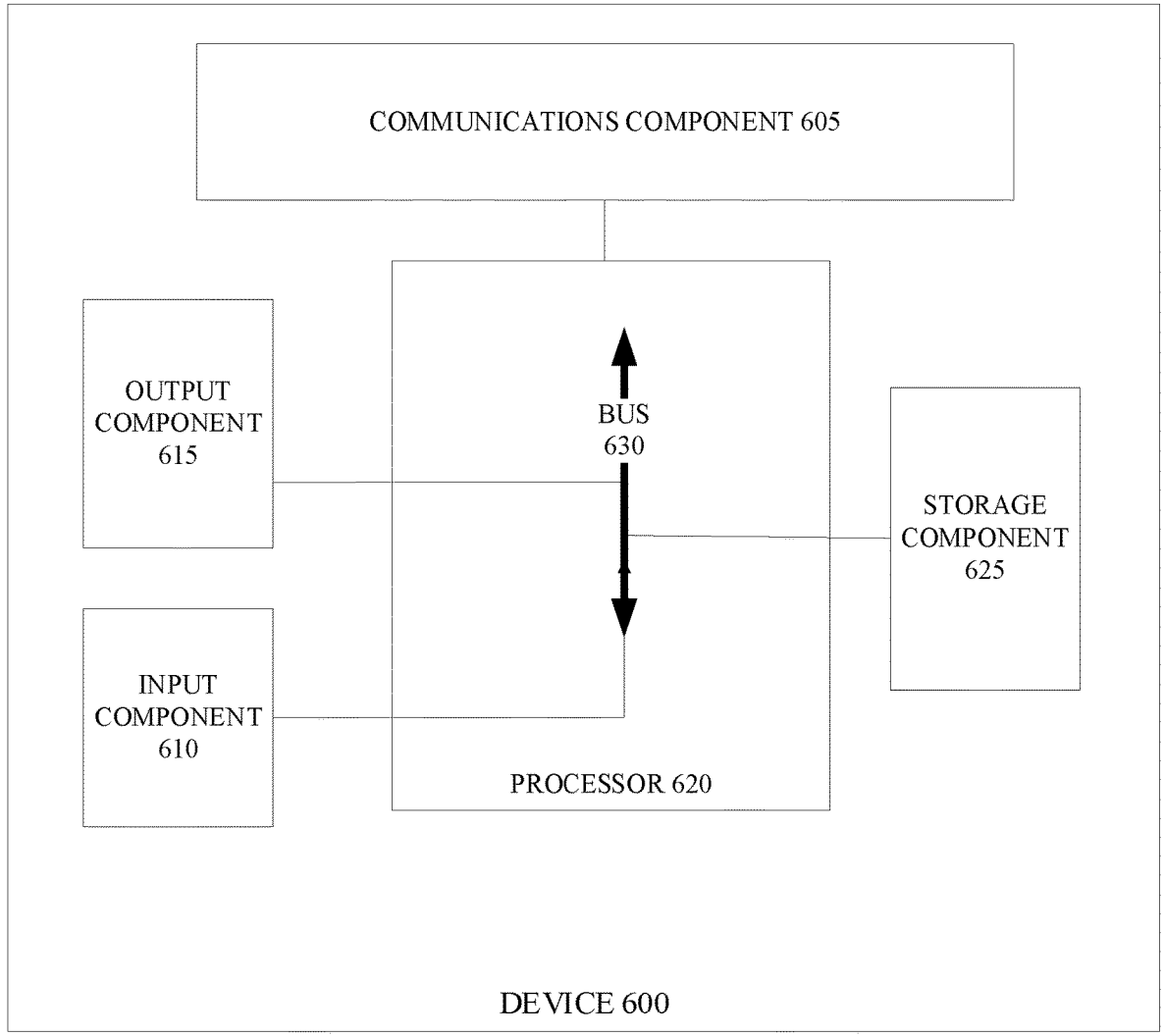
FIG. 6 is a diagram of example components of the host of FIG. 1.

FIG. 6 is a diagram of example components of one or more devices of FIG. 1. In some implementations, host 102 may include one or more devices 600 and/or one or more components of device 600. Device 600 may include, for example, a communications component 605, an input component 610, an output component 615, a processor 620, a storage component 625, and a bus 630. Bus 630 may include components that enable communication among multiple components of device 600, wherein components of device 600 may be coupled to be in communication with other components of device 600 via bus 630.

Input component 610 may include components that permit device 600 to receive information via user input (e.g., keypad, a keyboard, a mouse, a pointing device, a microphone, and/or a display screen), and/or components that permit device 600 to determine the location or other sensor information (e.g., an accelerometer, a gyroscope, an actuator, another type of positional or environmental sensor).

Output component 615 may include components that provide output information from device 600 (e.g., a speaker, display screen, and/or the like). Input component 610 and output component 615 may also be coupled to be in communication with processor 620.

Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 may include one or more processors capable of being programmed to perform a function. Processor 620 may be implemented in hardware, firmware, and/or a combination of hardware and software.

Storage component 625 may include one or more memory devices, such as random-access memory (RAM) 106, read-only memory (ROM), and/or another type of dynamic or static storage device (e.g., a flash memory, a magnetic memory, and/or optical memory) that stores information and/or instructions for use by processor 620. A memory device may include memory space within a single physical storage device or memory space spread across multiple physical storage devices. Storage component 625 may also store information and/or software related to the operation and use of device 600. For example, storage component 625 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 605 may include a transceiver-like component that enables device 600 to communicate with other devices, such as via a wired connection, a wireless connection, or a combination of wired and wireless connections. The communications component 605 may permit device 600 to receive information from another device and/or provide information to another device. For example, communications component 605 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 605 may also include one or more broadband and/or narrowband transceivers and/or other similar types of wireless transceiver configurable to communicate via a wireless network for infrastructure communications. Communications component 605 may also include one or more local area network or personal area network transceivers, such as a Wi-Fi transceiver or a Bluetooth transceiver.

Device 600 may perform one or more processes described herein. For example, device 600 may perform these processes based on processor 620 executing software instructions stored by a non-transitory computer-readable medium, such as storage component 625. As used herein, the term "computer-readable medium" refers to a non-transitory memory device. Software instructions may be read into storage component 625 from another computer-readable medium or from another device via communications component 605. When executed, software instructions stored in storage component 625 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more" The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device postpones entry into a read-only mode due to faulty blocks that cannot be written to on a memory device, the storage device comprises:
    a memory device divided into blocks, wherein blocks used for storing host data and covering a write capacity of the storage device are placed in a main area pool, blocks used for storing host data and for peak write operations are placed in a burst pool, and blocks used for storing control information are placed in a control pool; and
    a controller to execute a read-only mode extension protocol, in response to determining when faulty blocks in one of the main area pool, the burst pool, and the control pool is approaching a threshold for placing the storage device in a read-only mode phase, at least one of reduce and repurpose a number of the blocks, used for storing host data in the burst pool, to prevent the storage device from entering the read-only mode phase.

2. The storage device of claim 1, wherein the blocks in the burst pool are configured to store fewer bits per memory cell than the blocks in the main area pool.

3. The storage device of claim 1, wherein the read-only mode extension protocol includes a first read-only mode extension protocol wherein when the controller determines i) that the storage device is entering the read-only mode phase because of a newly faulty block used for storing host data in the burst pool and ji) that the burst pool has a predefined minimum number of available blocks used for storing host data, the controller increases a bad block threshold of the burst pool by a preconfigured value and reduces the predefined minimum number of available blocks used for storing host data in the burst pool by the preconfigured value.

4. The storage device of claim 3, wherein the controller determines the storage device is entering the read-only mode phase by comparing a number of bad blocks in the burst pool used for storing host data with the bad block threshold, wherein the bad block threshold represents a maximum allowable number of bad blocks in the burst pool.

5. The storage device of claim 1, wherein the read-only mode extension protocol includes a second read-only mode extension protocol wherein when the controller determines i) that the storage device is entering the read-only mode phase because of a newly faulty block in the main area pool and ii) that the burst pool has a predefined minimum number of available blocks used for storing host data, the controller subtracts a predefined number of blocks used for storing host data from the burst pool, adds the subtracted predefined number of blocks to the main area pool, configures the subtracted predefined number of blocks added to the main area pool to a format storing more bits per memory cell, increases a bad block threshold of the main area pool by a preconfigured value, and reduces the burst pool by the predefined number of blocks subtracted from the burst pool.

6. The storage device of claim 5, wherein the controller determines the storage device is entering the read-only mode phase by comparing a number of bad blocks in the main area pool with the bad block threshold, wherein the bad block threshold represents a maximum allowable number of bad blocks in the main area pool.

7. The storage device of claim 1, wherein the read-only mode extension protocol includes a third read-only mode extension protocol wherein when the controller determines i) that the storage device is entering the read-only mode phase because of a newly faulty block in the control pool and ii) that the burst pool has a predefined minimum number of available blocks used for storing host data, the controller subtracts a predefined number of blocks used for storing host data from the burst pool, adds the subtracted predefined number of blocks to the control pool, configures the subtracted predefined number of blocks added to the control pool to store control data, increases a bad block threshold of the control pool by a preconfigured value, and reduces the burst pool by the predefined number of blocks subtracted from the burst pool.

8. The storage device of claim 7, wherein the controller determines the storage device is entering the read-only mode phase by comparing a number of bad blocks in the control pool with the bad block threshold, wherein the bad block threshold represents a maximum allowable number of bad blocks in the control pool.

9. A method for delaying a storage device from entering into a read-only mode due to faulty blocks that cannot be written to on a memory device, the storage device comprises a controller to execute the method comprising:
    storing host data in blocks in a main area pool on the memory device, storing host data for peak write operations in blocks in a burst pool on the memory device, and storing control information in blocks in a control pool on the memory device; and
    executing a read-only mode extension protocol, in response to determining that faulty blocks in one of the main area pool, the burst pool, and the control pool is approaching a threshold for placing the storage device in a read-only mode phase, at least one of reducing and repurposing a number of the blocks, used for storing host data in the burst pool, to prevent the storage device from entering the read-only mode phase.

10. The method of claim 9, wherein executing the read-only mode extension protocol comprises executing a first read-only mode extension protocol including:
    determining i) that the storage device is entering the read-only mode phase because of a newly faulty block used for storing host data in the burst pool and ii) that the burst pool has a predefined minimum number of available blocks used for storing host data;
    increasing a bad block threshold of the burst pool by a preconfigured value; and
    reducing the predefined minimum number of available blocks used for storing host data in the burst pool by the preconfigured value.

11. The method of claim 10, further comprising determining the storage device is entering the read-only mode phase by comparing a number of bad blocks in the burst pool with the bad block threshold, wherein the bad block threshold represents a maximum allowable number of bad blocks in the burst pool.

12. The method of claim 9, wherein executing the read-only mode extension protocol comprises executing a second read-only mode extension protocol including:
- determining i) that the storage device is entering the read-only mode phase because of a newly faulty block in the main area pool and ii) that the burst pool has a predefined minimum number of available blocks used for storing host data;
- subtracting a predefined number of blocks used for storing host data from the burst pool;
- adding the subtracted predefined number of blocks to the main area pool;
- configuring the subtracted predefined number of blocks added to the main area pool to a format storing more bits per memory cell; and
- increasing a bad block threshold of the main area pool by a preconfigured value and reducing the burst pool by the predefined number of blocks subtracted from the burst pool.

13. The method of claim 12, further comprising determining the storage device is entering the read-only mode phase by comparing a number of bad blocks in the main area pool with the bad block threshold, wherein the bad block threshold represents a maximum allowable number of bad blocks in the main area pool.

14. The method of claim 9, herein executing the read-only mode extension protocol comprises executing a third read-only mode extension protocol including:
- determining i) that the storage device is entering the read-only mode phase because of a new faulty block in the control pool and ii) that the burst pool has a predefined minimum number of available blocks used for storing host data;
- subtracting a predefined number of blocks used for storing host data from the burst pool;
- adding the subtracted predefined number of blocks to the control pool;
- configuring the subtracted predefined number of blocks added to the control pool to store control data; and
- increasing a bad block threshold of the control pool by a preconfigured value and reducing the burst pool by the predefined number of blocks subtracted from the burst pool.

15. The method of claim 14, further comprising determining the storage device is entering the read-only mode phase by comparing a number of bad blocks in the control pool with the bad block threshold, wherein the bad block threshold represents a maximum allowable number of bad blocks in the control pool.

16. A method for delaying a storage device from entering into a read-only mode due to faulty blocks that cannot be written to on a memory device, the storage device comprises a controller to execute the method comprising:
- storing host data in blocks in a main area pool on the memory device, storing host data for peak write operations in blocks in a burst pool on the memory device, and storing control information in blocks in a control pool; and
- executing one of a first read-only mode extension protocol, a second read-only mode extension protocol, and a third read-only mode extension protocol,
- wherein the first read-only mode extension protocol includes determining i) that the storage device is entering a read-only mode phase because of a newly faulty block in the burst pool used for storing host data and ii) that the burst pool has a first predefined minimum number of available blocks used for storing host data; increasing a bad block threshold of the burst pool by a preconfigured value; and reducing the first predefined minimum number of available blocks used for storing host data in the burst pool by the preconfigured value;
- wherein the second read-only mode extension protocol includes determining i) that the storage device is entering the read-only mode phase because of a newly faulty block in the main area pool and ii) that the burst pool has a predefined minimum number of available blocks used for storing host data; subtracting a predefined number of blocks used for storing host data from the burst pool; adding the subtracted predefined number of blocks to the main area pool; configuring the subtracted predefined number of blocks added to the main area pool to a format storing more bits per memory cell; reducing the burst pool by the predefined number of blocks subtracted from the burst pool; and
- wherein the third read-only mode extension protocol includes determining i) that the storage device is entering the read-only mode phase because of a new faulty block in the control pool and ii) that the burst pool has a predefined minimum number of available blocks used for storing host data; subtracting a first predefined number of blocks used for storing host data from the burst pool; adding the subtracted first predefined number of blocks to the control pool; configuring the subtracted first predefined number of blocks added to the control pool to store control data; and reducing the burst pool by the first predefined number of blocks subtracted from the burst pool.

17. The method of claim 16, further comprising determining that a number of faulty blocks in one of the burst pool, the main area pool, and the control pool is equal to a threshold specifying a maximum number of allowable faulty blocks in one of the burst pool, the main area pool, and the control pool and placing the storage device in the read-only mode.

18. The method of claim 16, further comprising determining that the burst pool does not have a predefined minimum number of available blocks used for storing host data and placing the storage device in the read-only mode.

* * * * *